United States Patent [19]

Lutz et al.

[11] Patent Number: 4,898,136
[45] Date of Patent: Feb. 6, 1990

[54] MIXTURE-COMPRESSING INTERNAL-COMBUSTION ENGINE WITH A MAIN COMBUSTION CHAMBER AND AN AUXILIARY COMBUSTION CHAMBER

[75] Inventors: Wolfgang Lutz, Stuttgart; Robert Happel, Waiblingen, both of Fed. Rep. of Germany

[73] Assignee: Daimler-Benz AG, Fed. Rep. of Germany

[21] Appl. No.: 320,523

[22] Filed: Mar. 8, 1989

[30] Foreign Application Priority Data

Mar. 10, 1988 [DE] Fed. Rep. of Germany ....... 3807841

[51] Int. Cl.⁴ .............................................. F02B 17/00
[52] U.S. Cl. .................................... 123/269; 123/260
[58] Field of Search ............... 123/269, 260, 266, 268, 123/262

[56] References Cited

U.S. PATENT DOCUMENTS

| | | | |
|---|---|---|---|
| 1,605,381 | 11/1926 | Wirrer | 123/289 |
| 2,256,776 | 9/1941 | Kammor | 123/289 |
| 2,511,992 | 1/1950 | Quick | 123/269 |
| 3,057,334 | 10/1962 | Bailey | 123/269 |
| 3,220,389 | 11/1965 | Van Rinsum et al. | 123/269 |
| 4,203,393 | 5/1980 | Giardini | 123/289 |
| 4,487,177 | 12/1984 | Ishikawa | 123/260 |

FOREIGN PATENT DOCUMENTS

| | | | |
|---|---|---|---|
| 104050 | 8/1926 | Fed. Rep. of Germany | 123/289 |
| 262655 | 6/1976 | Fed. Rep. of Germany | 123/289 |
| 3025926 | 7/1980 | Fed. Rep. of Germany | 123/289 |

Primary Examiner—Raymond A. Nelli
Attorney, Agent, or Firm—Barnes & Thornburg

[57] ABSTRACT

The subject of the invention is a mixture-compressing spark-ignition internal-combustion engine with a main combustion chamber and an auxiliary combustion chamber in the cylinder head. The auxiliary combustion chamber has a spark plug and is connected to the main combustion chamber by an overflow bore. The overflow bore is aligned with the piston crown in such a way that an emerging ignition jet aims at a surface region of the piston crown. According to the invention, the overflow bore is arranged concentrically with respect to the longitudinal center axis of the cylinder and the surface region of the piston crown is designed as an impact area lying opposite the bore and running orthogonally with respect to the jet direction.

14 Claims, 2 Drawing Sheets

MIXTURE-COMPRESSING INTERNAL-COMBUSTION ENGINE WITH A MAIN COMBUSTION CHAMBER AND AN AUXILIARY COMBUSTION CHAMBER

BACKGROUND AND SUMMARY OF THE INVENTION

The invention relates to a mixture-compressing spark-ignition internal-combustion engine of the type having a cylinder head, which has a depression serving as a main combustion chamber and an auxiliary combustion chamber provided with a spark plug and connected to the main combustion chamber by an overflow bore, through which a part of the fuel/air mixture from the main combustion chamber is compressed by a piston and, after ignition has taken place, leaves at high pressure and velocity as an ignition jet with a jet direction aiming at a surface region of the piston crown.

An internal-combustion engine of the generic type is known, for example, from German Patent Specification No. 2,626,550. In this case, the auxiliary combustion chamber is arranged close to the upper crest region of the hemispherically shaped main combustion chamber. The auxiliary combustion chamber has, furthermore, an overflow bore of a relatively large cross-section. This is aligned with the main combustion chamber in such a way that the emerging ignition jet flows with a tangential flow component into the main combustion chamber and consequently sets the compressed fuel/air mixture in motion. Due to the described position of the overflow opening in the main combustion chamber, the ignition of the mixture begins in the upper section of the main combustion chamber, from which subsequently the flame front spreads in the direction of the piston. During this process, unburned fuel/air mixture is compressed into the fire land gap of the piston, which is the main cause of increased residual hydrocarbons in the exhaust.

An object of the invention is to redesign a known internal-combustion engine with a main combustion chamber and an auxiliary combustion chamber in such a way that a complete burning of the fuel/air mixture with a high mass fraction and greatly reduced fractions of pollutants, in particular of unburned hydrocarbons, is achieved.

This object is achieved according to preferred embodiments of the invention by providing an arrangement wherein the overflow bore is aligned concentrically with respect to the longitudinal center axis of the cylinder and the surface region of the piston crown is designed as a level impact area lying opposite the overflow bore and running orthogonally with respect to the jet direction of the ignition jet.

It is achieved by the invention that the ignition jet leaving the overflow bore at high pressure and velocity strikes the impact area on the piston crown after a shortest possible path. It is thereby ensured by a relatively short jet path that the ignition jet is not broken up by mixture movements in the main combustion chamber and that, in any event, initially only a proportion of mixture lying in the peripheral region of the ignition jet is ignited. Due to the orthogonal position of the impact area with respect to the direction of the ignition jet, the latter is fanned out evenly in radial direction after striking the impact area. The tongues of fire shooting away as a result in radial direction over the piston crown produce a surface fire above the piston crown, which, after reaching the cylinder wall, is deflected into the depression of the cylinder head and partially into the fire land gap. The ignition of the fuel/air mixture in the main combustion chamber thus begins by the surface fire or the fire veil above the piston crown. The flame front emerging from this spreads in this case in the direction of the depression in the cylinder head crown. The unburned fuel/air mixture ahead of the flame fron is consequently compressed under increasing pressure in the direction of the depression. With the invention, thus a combustion sequence which has the particular advantages mentioned below is achieved:

- Due to the fire veil, the fire land gap is isolated from the unburned mixture and, together with the movement of the flame front, it is prevented that unburned mixture can be forced into the fire land gap. As a result, a considerable reduction in the unburned hydrocarbons in the exhaust is achieved.
- Owing to the expansive ignition of the fuel/air mixture, the combustion takes place with a high energy conversion rate. As this is associated with an increase in the constant-volume combustion, it results in an improvement in the process efficiency.
- Due to the high energy conversion rate, and the concomitant high speed at which the mixture completely burns, the occurrence of an entrained combustion is reduced.
- Due to the expansive ignition of the mixture, good preconditions for the use of much leaner mixtures without appreciable disturbances in the combustion sequence are provided.

According to preferred embodiments of the invention an arrangement is provided wherein a shielding of the ignition jet from the mixture compressed in the main combustion chamber is provided, as a result of which an ignition of parts of the mixture in the vicinity of the ignition jet is prevented to a great extent.

In certain preferred embodiments, arrangements are provided wherein in an upper dead center position of the piston, the impact area has a distance from the mouth of the overflow bore of approximately 4 mm to 10 mm. In certain preferred embodiments, arrangements are provided wherein the volume $V_{HB}$ of the auxiliary combustion chamber has approximately 0.01 to 0.03 of the compression volume $V_C$ of the main combustion chamber. These dimensional ranges have the effect of ensuring that the ignition jet strikes the impact area on the piston crown with both the energy required for fast burning of the mixture and with a desired high velocity.

With a design of the main combustion chamber according to certain preferred embodiments wherein the depression in the cylinder head crown has the shape of an inverted omega as seen in cross-section, it is achieved that the flame front emerging from the piston crown advances as equidistantly as possible in the direction of the wall limitation on the cylinder head side of the main combustion chamber.

In order that the ignition jet fanned out over the piston crown reaches the cylinder walls in the shortest possible time, it is advantageously provided in certain preferred embodiments that the piston crown is provided with an omega-shaped hollow as seen in cross-section, the elevation of which hollow in the region of the longitudinal center axis of the cylinder is flattened off as a level impact area. In other preferred embodiments the piston crown has a calotte-shaped hollow. In other preferred embodiments the piston crown has an overall level surface.

Finally, it is advantageous for the progression of the ignition jet according to especially preferred embodiments if the overflow bore has a diameter of 1 to 3 mm.

Other objects, advantages and novel features of the present invention will become apparent from the following detailed description of the invention when considered in conjunction with the accompanying drawings.

DETAILED DESCRIPTION OF THE DRAWINGS

Figure 1:
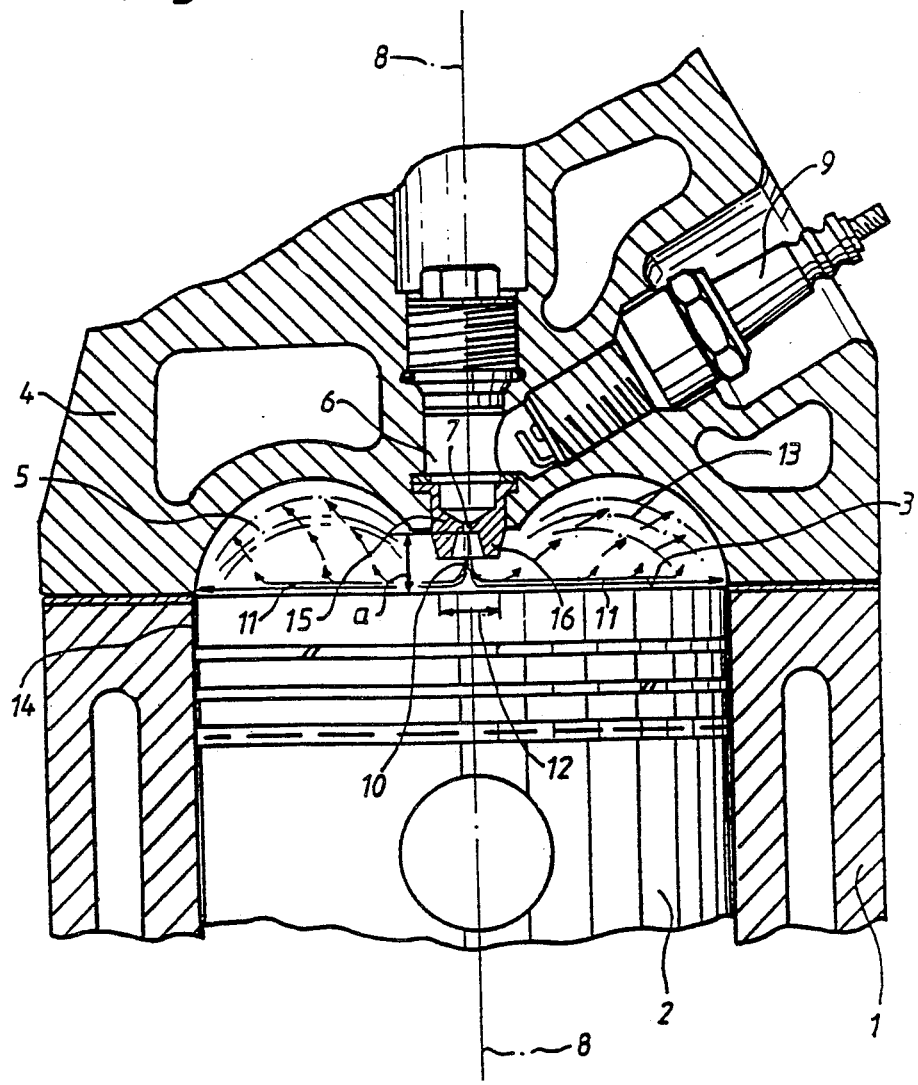
FIG. 1 shows the main combustion chamber, limited by a level piston crown, of an internal-combustion engine constructed according to a preferred embodiment of the invention.

The internal-combustion engine according to FIG. 1 has a cylinder 1 and a lifting piston 2. The piston 2, shown in upper dead center position, has a level piston crown 3, which together with a depression in a cylinder head 4 covering the cylinder 1 delimits a main combustion chamber 5. In the cylinder head 4 there is an auxiliary combustion chamber 6, which is connected to the main combustion chamber 5 by an overflow bore 7. The overflow bore 7 is aligned concentrically with respect to the longitudinal center axis 8 of the cylinder 1. In the auxiliary combustion chamber 6 is arranged a spark plug 9, which ignites the fuel/air mixture compressed into the auxiliary combustion chamber during the compression cycle of the main combustion chamber.

The bundled ignition jet 10 leaving the auxiliary combustion chamber at high pressure and velocity strikes a surface region of the piston crown 3 lying opposite the overflow bore 7 and marked by an arrow line and thereby explodes into tongues of fire 11, shooting outwards radially over the piston crown 3. In order to achieve as even a distribution as possible of the tongues of fire 11 over the entire area of the piston crown, the surface region is designed as a level impact area 12 running orthogonally with respect to the jet direction of the ignition jet 10. The tongues of fire 11 shooting out from the impact area 12 in the direction of the cylinder wall ignite the compressing fuel/air layer passing through, so that there develops above the piston crown 3 a surface fire or fire veil, the starting point for the ignition of the mixture in the main combustion chamber 5. At the same time, the fire veil forms a barrier layer between the fire land gap 14 on the piston 2 and the mixture above it. From the fire veil, the burning of the mixture away from the piston 2 in the direction of the cylinder head 4 subsequently takes place. Since the combustion already commences with the shooting-out of the tongues of fire 11 in the direction of the cylinder wall, the flame front spreads into the depression with a contour which is slightly curved out towards the limitation on the cylinder head side, as represented by the dot-dashed limes 13. The movement of the flame front towards the combustion chamber limitation on the cylinder head side in this case progresses approximately equidistantly. As a result, it is prevented that unburned mixture can be compressed into the fire land gap 14 during the combustion. Due to the expansive ignition of the mixture, a combustion sequence with a high energy conversion rate, an increased rate of complete burning and, associated with this, a steep pressure increase during combustion are produced.

The auxiliary combustion chamber 6 formed in the cylinder head 4 is delimited from the main combustion chamber 5 by a pot-shaped insert piece 15, which also contains the overflow bore 7, fitted into the cylinder head crown. This insert piece 15 is formed with a protective tube 16 surrounding the overflow opening 7 and extending concentrically with respect to the axis 8 in the direction of the piston crown.

As a result, the ignition jet 10 is shielded in the best possible way from the still unburned mixture in the main combustion chamber 5 and a premature ignition of the mixture is avoided. In order that the flame front can advance undisturbed in the main combustion chamber 5, it is particularly advantageous if the latter is formed with a limiting wall on the cylinder head side which is substantially adapted to the contour of the flame front, as a result of which the main combustion chamber 5 is given—seen in cross-section—the shape of an inverted omega. Other shapes of the main combustion chamber 5 are conceivable within the scope of the invention, without thereby impairing the advantageous effects of the invention.

As far as a rapid ignition of the mixture is concerned, and to achieve the highest possible burning rates, it is, for example, advantageous if the volume ($V_{HB}$) of the auxiliary combustion chamber 6 is approximately 0.01 to 0.03 the compression volume $V_C$ of the main combustion chamber 5. In this case, a highest possible flow velocity of the ignition jet 10 leaving the auxiliary combustion chamber 6 is achieved if the overflow bore has a diameter of 1 to 3 mm and if, in the upper dead center position of the piston 2, the bore is a distance "a" of approximately 4 to 10 mm away from the impact area 12, 18.

Figure 2:
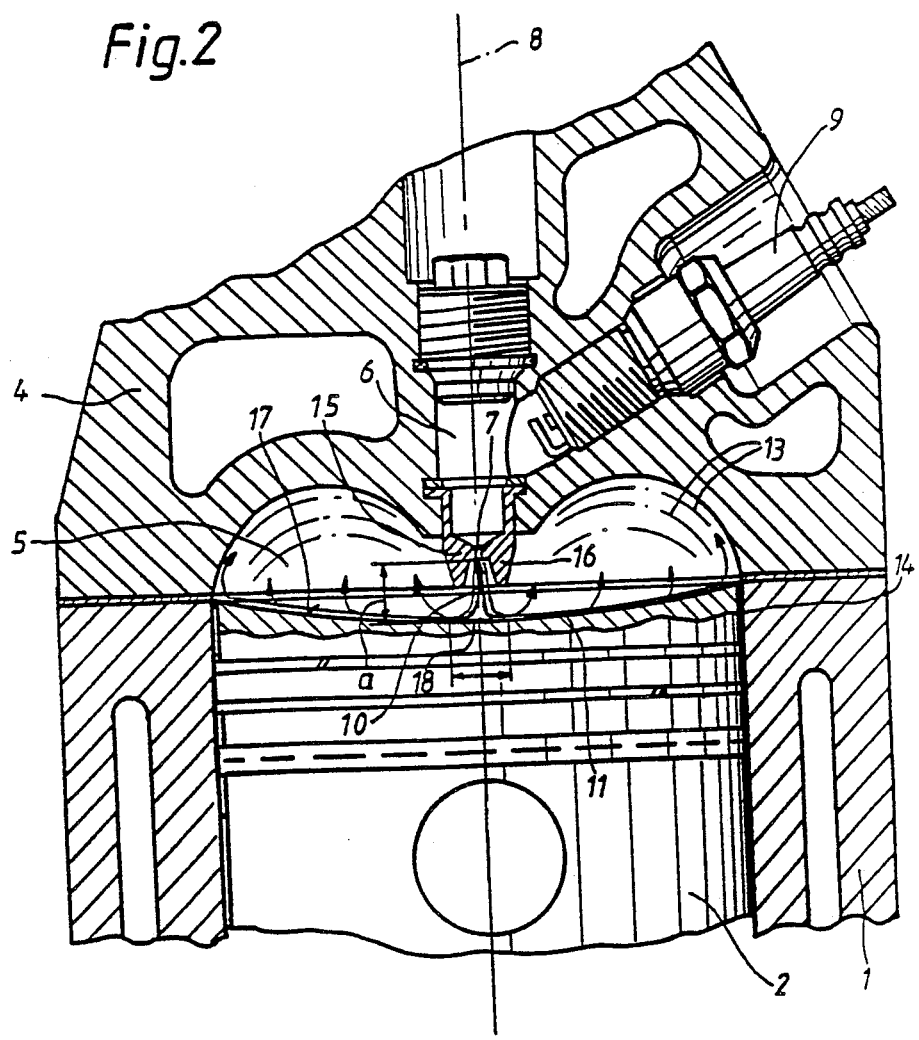
FIG. 2 shows the main combustion chamber from FIG. 1, but with a calotte-shaped piston crown as combustion chamber limitation on the piston side, constructed according to another preferred embodiment of the invention.

The exemplary embodiment if FIG. 2 differs from that of FIG. 1 only in that the piston 2 is provided with a calotte-shaped piston crown 17. As a result, the tongues of fire 11 deflected from the impact area 18 are directed towards the depression, by which an improved deflection of the tongues of fire 11 at the combustion chamber limitation is achieved.

As a departure from this, the piston crown 3 may also be provided with an omega-shaped hollow, the elevation of which, lying in the region of the longitudinal center axis 8 of the cylinder, is designed as a level impact area.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Mixture-compressing spark-ignition internal-combustion engine with a cylinder head, which has a depression serving as a main combustion chamber and an auxiliary combustion chamber provided with a spark plug and connected to the main combustion chamber by an overflow bore, through which a part of the fuel/air mixture from the main combustion chamber is compressed by a piston and, after ignition has taken place, leaves at high pressure and velocity as an ignition jet with a jet direction aiming at a surface region of the piston crown, wherein the overflow bore is aligned concentrically with respect to the longitudinal center axis of the cylinder and the surface region of the piston crown is designed as a level impact area lying opposite the overflow bore and running orthogonally with respect to the jet direction of the ignition jet.

2. Mixture-compressing internal-combustion engine according to claim 1, wherein a protecting tube, extending in the direction of the main combustion chamber, is arranged ahead of the overflow bore.

3. Mixture-compressing internal-combustion engine according to claim 1 wherein, in an upper dead center position of the piston, the impact area has a distance from the mouth of the overflow bore of approximately 4 mm to 10 mm.

4. Mixture-compressing internal-combustion engine according to claim 2 wherein, in an upper dead center position of the piston, the impact area has a distance from the mouth of the overflow bore of approximately 4 mm to 10 mm.

5. Mixture-compressing internal-combustion engine according to claim 1, wherein the volume $V_{HB}$ of the auxiliary combustion chamber has approximately 0.01 to 0.03 of the compression volume $V_C$ of the main combustion chamber.

6. Mixture-compressing internal-combustion engine according to claim 3, wherein the volume $V_{HB}$ of the auxiliary combustion chamber has approximately 0.01 to 0.03 of the compression volume $V_C$ of the main combustion chamber.

7. Mixture-compressing internal-combustion engine according to claim 1, wherein the depression in the cylinder head crown has the shape of an inverted omega as seen in cross-section.

8. Mixture-compressing internal-combustion engine according to claim 6, wherein the depression in the cylinder head crown has the shape of an inverted omega as seen in cross-section.

9. Mixture-compressing internal-combustion engine according to claim 1, wherein the piston crown is provided with an omega-shaped hollow as seen in cross-section, the elevation of which hollow in the region of the longitudinal center axis of the cylinder is flattened off as a level impact area.

10. Mixture-compressing internal-combustion engine according to claim 3, wherein the piston crown is provided with an omega-shaped hollow as seen in cross-section, the elevation of which hollow in the region of the longitudinal center axis of the cylinder is flattened off as a level impact area.

11. Mixture-compressing internal-combustion engine according to claim 1, wherein the piston crown has a calotte-shaped hollow.

12. Mixture-compressing internal-combustion engine according to claim 1, wherein the piston crown has an overall level surface.

13. Mixture-compressing internal-combustion engine according to claim 1, wherein the overflow bore is designed with a diameter in the range from 1 to 3 mm.

14. Mixture-compressing internal-combustion engine according to claim 6, wherein the overflow bore is designed with a diameter in the range from 1 to 3 mm.

* * * * *